Jan. 22, 1957 H. E. ENGLESON ET AL 2,778,476
CONVEYING AND TRANSPORTING MECHANISM FOR ELONGATED ARTICLES
Filed March 21, 1955 7 Sheets-Sheet 1

INVENTORS:
HARRY E. ENGLESON
ELMER D. SRAMEK
BY
Margall, Johnston, Cook & Root
ATT'YS

Jan. 22, 1957    H. E. ENGLESON ET AL    2,778,476
CONVEYING AND TRANSPORTING MECHANISM FOR ELONGATED ARTICLES
Filed March 21, 1955      7 Sheets-Sheet 5

INVENTORS:
HARRY E. ENGLESON
ELMER D. SRAMEK
BY
Marzall, Johnston, Cook & Root
ATT'YS Jan. 22, 1957 H. E. ENGLESON ET AL 2,778,476
CONVEYING AND TRANSPORTING MECHANISM FOR ELONGATED ARTICLES
Filed March 21, 1955 7 Sheets-Sheet 7

*INVENTORS:*
HARRY E. ENGLESON
ELMER D. SRAMEK
BY
*Margall, Johnston, Cook & Root*
ATT'YS United States Patent Office 2,778,476
Patented Jan. 22, 1957

2,778,476

CONVEYING AND TRANSPORTING MECHANISM FOR ELONGATED ARTICLES

Harry E. Engleson, Chicago, and Elmer D. Sramek, Cicero, Ill., assignors to F. B. Redington Co., Chicago, Ill., a corporation of Delaware Application March 21, 1955, Serial No. 495,415

13 Claims. (Cl. 198—35)

This invention relates to packaging machinery, and more particularly to apparatus for loading elongated articles into a conveyor bucket to facilitate their transport and packaging.

Machinery for processing and packaging articles of manufacture commonly includes a movable conveyer having especially adapted holders fixed thereto for the purpose of holding and carrying the articles. In the industry these special holders are known as "buckets," and for the purpose of this specification the term bucket will be used accordingly.

It is an object of this invention to provide improved apparatus for handling and packaging elongated articles such as cigars, pencils, crayons, chalk, stick candy, and the like.

A further object of this invention is to provide an improved method for assembling a predetermined number of such elongated articles into a compact bunch wherein the articles lie mutually parallel and in one or more layers; and for loading a bucket on a movable conveyer with the articles in the assembled bunch.

Another object is to provide apparatus wherein the elongated articles are moved between parallel dividing partitions which may be lifted, whereby the articles will continue to lie in a mutually parallel arrangement, and wherein side members close together upon the assembled articles to bunch them into a closer configuration made possible by the removal of the dividing partitions.

A further object is to provide means for bunching elongated articles, means for carrying the bunched articles in a cantilevered position over a moving conveyer bucket, means for depressing the forward or cantilevered ends of the articles into the bucket, and means for depressing the rearward ends into the bucket as the carrying means is withdrawn.

Another object is to provide a bucket for a movable conveyer dimensioned to receive and hold a predetermined number of elongated articles bunched in layers, said bucket being formed to permit depressor members and the like to move into close proximity with the bucket without interference therewith to facilitate loading the bunched articles into the bucket.

A further object is to provide a plurality of bucket loading stations and a system of synchronization to permit each loading station to load its proportionate share of the buckets as they move on the conveyer, thereby permitting the conveyer to move at a faster rate.

A more complete understanding of the present invention, its mode of operation and its advantages may be gathered from further reading of this specification together with an inspection of the accompanying drawings, in which.

Figure 1:
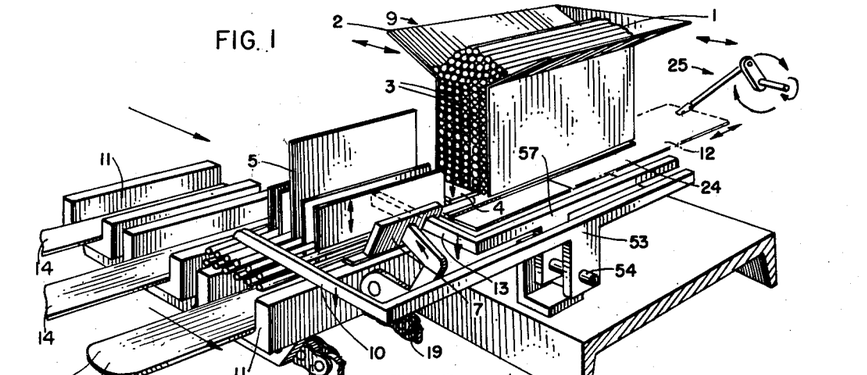
Fig. 1 is a perspective view of a portion of a packaging machine illustrating particularly the bucket loading apparatus of this invention.
Figure 5:
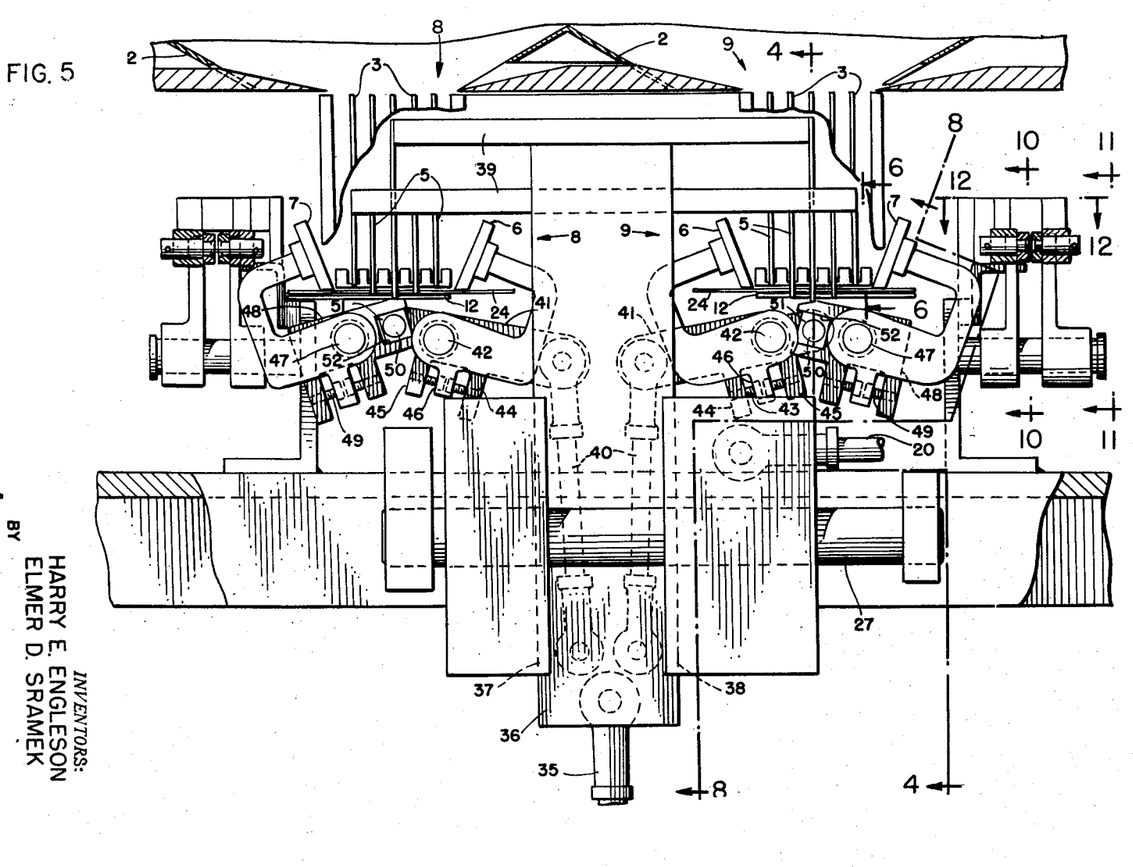
Fig. 5 is a vertical section along the broken line 5—5 of Fig. 4 and illustrating particularly the assembly of the bunching apparatus.

The elongated articles 1 which are initially stacked in a hopper 2 are permitted to descend in parallel chutes defined by fixed dividing partitions 3 which maintain the articles in a mutually parallel relation to each other as may be seen in Fig. 1. A pusher member 4 moves a predetermined number of the articles 1 in a direction longitudinal to their axes from each chute between the fixed partitions 3 into corresponding spaces between movable dividing partitions 5. The movable partitions and a pair of bunching members 6 and 7, positioned on each side of the movable partitions, constitute a buncher assembly which is associated with each bucket loading station. As is illustrated in Figs. 2 and 5, the packaging machine may include two such loading stations 8 and 9.

Figure 17:
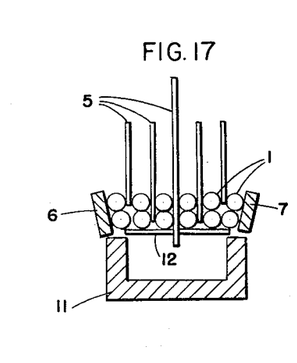
Figs. 17, 18, and 19 are schematic views illustrating in timed sequence the mode of operation of the bunching apparatus.
Figure 18:
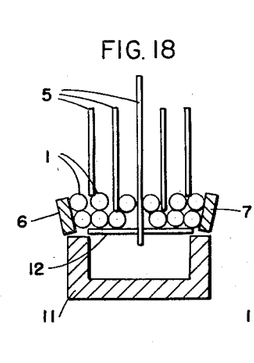
Figure 19:
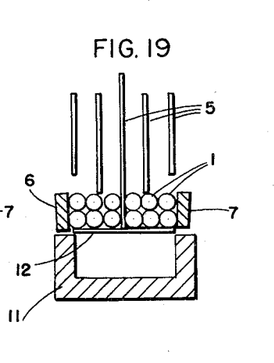

As shown schematically in the Figs. 17, 18, and 19, bunching of the articles is accomplished by the movable partitions 5 being lifted and the bunching members 6 and 7 are simultaneously moved together, thereby limiting the space occupied by the articles 1 and causing them to shift into closer proximity with each other. As is illustrated in Fig. 19, the center partition may remain to stabilize the articles and prevent them from shifting uncontrollably, and to minimize the motion required for lifting the partitions.

Figure 15:
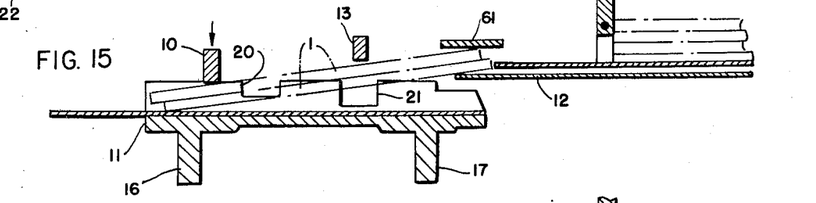
Fig. 15 is a schematic view illustrating the bucket loading operation in which the forward or cantilevered ends of the articles are depressed into the conveyer buckets.
Figure 16:
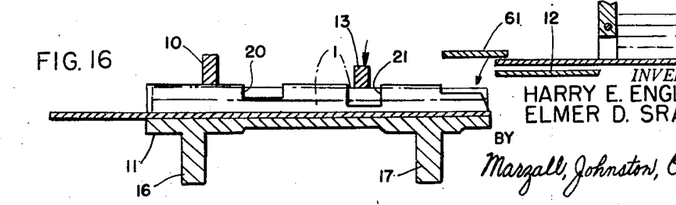
Fig. 16 is a schematic view similar to Fig. 15 showing the subsequent bucket loading operation in which the rearward ends are depressed into the bucket as the supporting means is withdrawn from beneath the articles.

The bunched articles 1 cantilever forward from the confines of the movable partitions 5, and as illustrated in Figs. 15 and 16, a depressor member 10 engages the bunched articles and depresses the cantilevered, forward ends into a bucket 11. Simultaneously with the depressing of the cantilevered ends, a support plate 12 moves from under the bunched articles to permit them to drop into the bucket 11. A second depressor member 13 extending through slots 13' in the partitions 5 depresses the articles 1 as the support plate 12 is fully removed and the operation of loading the bucket 11 is thereby completed.

Figures 2, 3:
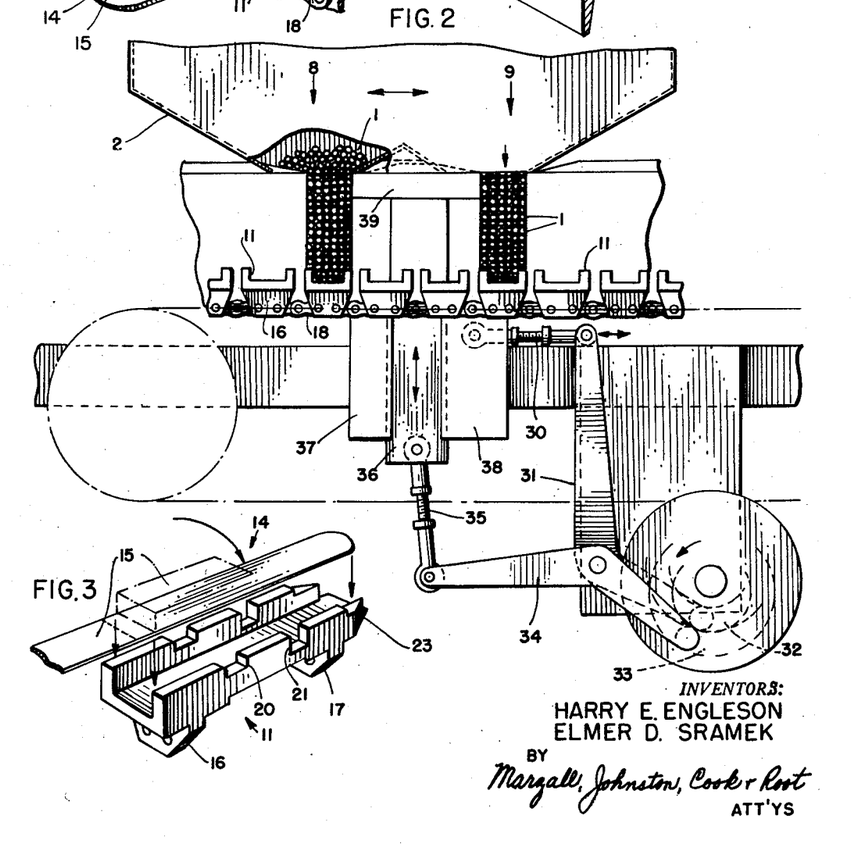
Fig. 2 is a front elevational view of that portion of the packaging machine showing the bucket loading mechanism.
Fig. 3 is a perspective view of a single bucket and illustrating the manner in which a package liner is inserted into the bucket and folded over to contain the elongated articles therein.
Figure 4:
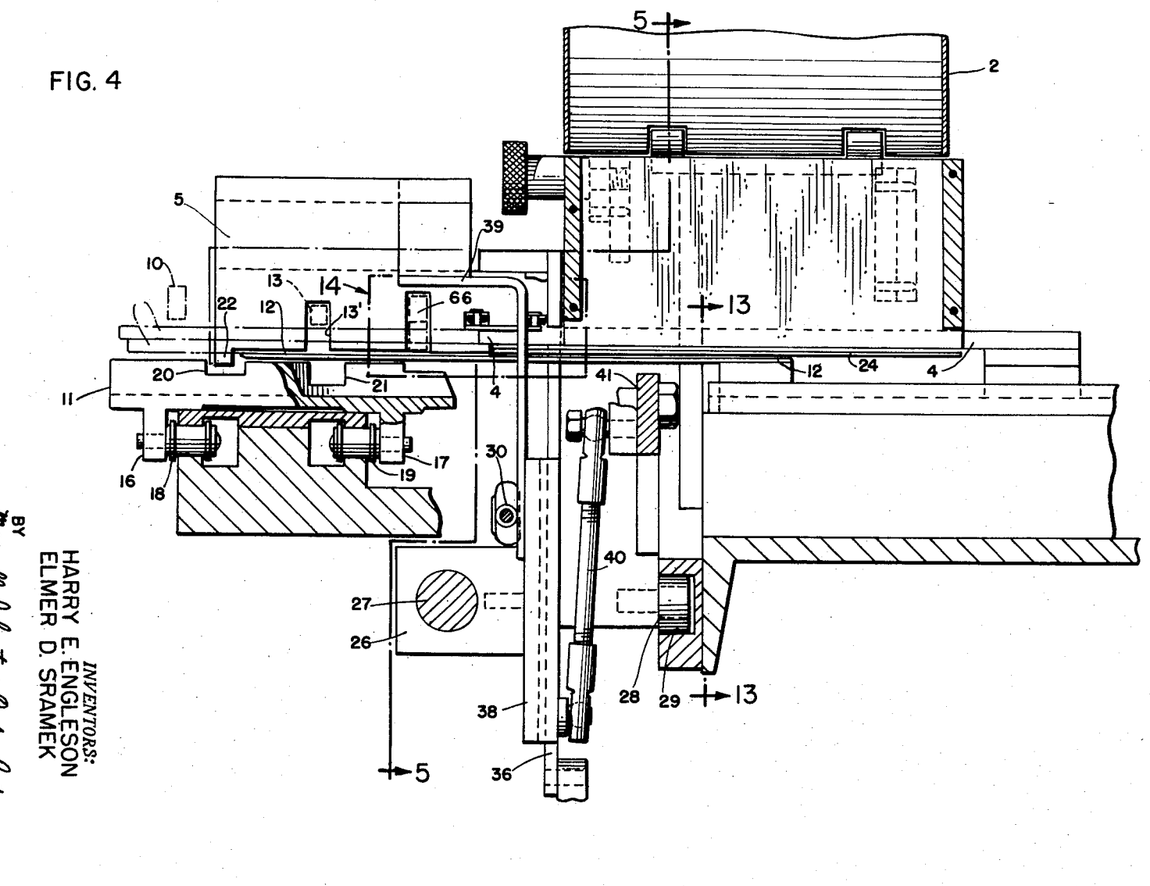
Fig. 4 is a vertical section along the broken line 4—4 of Fig. 5 and showing the bucket loading apparatus in its relation to the conveyer and buckets thereon.
Figures 6, 7, 8, 9:
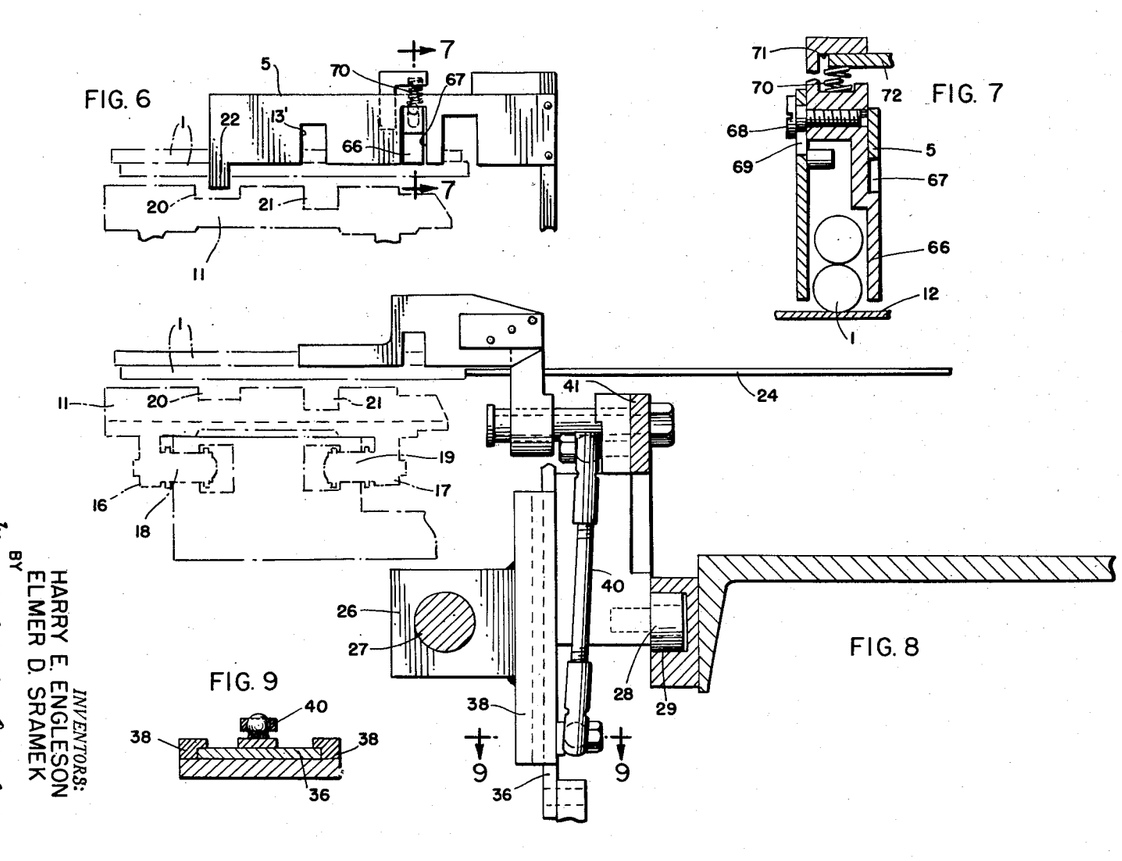
Fig. 6 is a vertical section along the line 6—6 of Fig. 5 showing the dividing partitions in elevation.
Fig. 7 is a vertical section along the line 7—7 of Fig. 6 showing a detail of a drop extension of the movable dividing partition.
Fig. 8 is a vertical section along the broken line 8—8 of Fig. 5 and illustrating the manner of operation of the bunching apparatus.
Fig. 9 is a horizontal section along the line 9—9 of Fig. 8 and showing a slide bar attachment for a pusher rod for operating the buncher member more extensively shown in Fig. 8.

The conveyer bucket 11 which is illustrated in detail in Fig. 3, may form a generally rectilinear trough having appropriate inside dimensions to hold a predetermined number of elongated articles in a desired configuration. A package liner 14 may be inserted into the bucket prior to its being loaded with articles. This liner may be a strip of cardboard which will initially lie along the bottom of the bucket 11 and an elongated flap 15 may subsequently be folded upward and rearward as illustrated in Fig. 3 to partially enclose the articles 1 after they have been placed in the bucket. A tab 16 is subsequently folded upward and becomes a convenient handle for use in removing the articles 1 from the package. The bucket 11 comprises a pair of lugs 16 and 17 for attachment to chains 18 and 19 forming the conveyer (Figs. 1, 2 and 4). The bucket may further have notches 20 and 21 in the left and right hand walls thereof, and longitudinal with respect to the motion of the conveyer. The notch 20 permits the bucket to move past side extension 22 without interference therewith, as shown in Figs. 4 and 6. The notch 21 permits the depressor bar 13 to descend across the bucket 11 without interference therewith, as shown in Fig. 16. In subsequent operations of the packaging machine, the notches will permit guide members positioned over the conveyer (not shown) to engage and retain the articles within the bucket 11 without interference with the bucket itself.

The rearward end 23 of the bucket 11 may be tapered to facilitate further packaging operations wherein the bunched elongated articles and their enclosing package liners may be moved from the bucket into a carton.

The elongated articles 1 descending from the hopper 2 are maintained mutually parallel by the fixed dividing partitions 3, and the lowermost articles rest upon a stationary support plate 24. The movable support plate 12 moves under the stationary plate with a reciprocating motion by a mechanism which may be a crank and connecting link 25 illustrated in Fig. 1. As the movable support plate 24 begins its forward motion, the pusher member 4 which moves forward with the plate 24 engages a predetermined number of articles from each of the parallel chutes and moves them forward into a position between the movable dividing partitions 5. The movable partitions 5 are positioned partially over the conveyer and the articles 1 will cantilever forward from the confines of the partitions 5 and substantially over the moving conveyer bucket 11.

The article bunching assembly, including the partitions 5, is mounted to move for a limited distance in the direction of motion of the conveyer. As shown in Fig. 4 this assembly is supported on bearing members 26, slidably mounted on a stationary shaft 27 and on rollers 28 positioned in a guideway 29.

Fig. 2 shows the driving means for the buncher assembly as a link 30 which is actuated by a bell crank lever 31 which in turn is rocked by engagement with a rotating cam 32. A second cam 33 mounted to turn with cam 32 rocks a second bell crank lever 34 that in turn operates a second link 35, causing a slide member 36 to move vertically between guides 37 and 38. The slide member 36 is directly connected to the movable dividing partitions 5 by a supporting structure 39, and the vertical motion of the dividing partitions 5 will be synchronized with the horizontal motion along the conveyer since the motions are derived from cams 32 and 33 on the same driven shaft.

To assure that the buncher members 6 and 7 close in upon the elongated articles at the same moment in which the dividing partitions 5 are lifted, the bunchers 6 and 7 are driven from the same vertical slide member 36 that raises the partitions 5. As shown in Fig. 5, connecting links 40 provide linkage between the slide member 36 to actuate the bunchers 6 and 7. Each connecting link 40 rocks a lever 41 about a pivot point 42. The buncher member 6 is adjustably attached to the lever 41 and likewise pivots about the same pivot point 42. To permit adjustment in the motion and clearances of the buncher member 6, a threaded adjusting means 43 is secured to lugs 44 and 45 integral with the lever 41, and adjustably holds a lug 46 to secure the two members together.

The buncher members 7 are mounted to pivot about points 47 together with pivotal members 48 to which they are attached by lugs and a threaded adjusting means 49 in a manner similar to that in which the buncher 6 was mounted on the lever 41. The rocking members 48 and the connecting buncher members 7 are toggled by slot and square block on stud arrangements whereby motion of one rocking member is transmitted to the other. This linkage includes a stud 50 on an extension of the lever 41. A square block 51 is mounted to pivot about the stud 50 and is slidably mounted in a guideway 52 provided on the pivotal member 48.

As illustrated in Figs. 17, 18, and 19, the movable partitions 5 have extensions 22 which are of varying lengths as they extend downward in the vicinity of the bucket 11. When the movable partition assembly is lifted, the outside partitions having shorter extensions 22 are the first to be removed from between the adjacent positioned elongated articles, and as they are withdrawn, the bunchers 6 and 7 gradually close together to crowd the articles 1. This crowding causes the articles 1 to gather together gradually to compensate for the increased space resulting from the lifting of the partition and for the clearance spaces initially allowed between the articles 1 and the separating partitions 5. Fig. 18 illustrates schematically the condition after the outermost partitions have been removed and the second pair of partitions is being removed. At this point the articles would have a tendency to misalign if it were not for the fact that the bunchers 6 and 7 have closed in upon the articles to restrain them. Fig. 19 illustrates the position with the bunchers at their extreme closed position and with the partitions raised to the maximum. When the articles are to be arranged in a configuration as shown in Figs. 17, 18, and 19, wherein they form two layers with six articles in each layer, it has been found unnecessary to completely remove the center partition, and the extended part 22 remains between adjacent articles.

Figure 10:
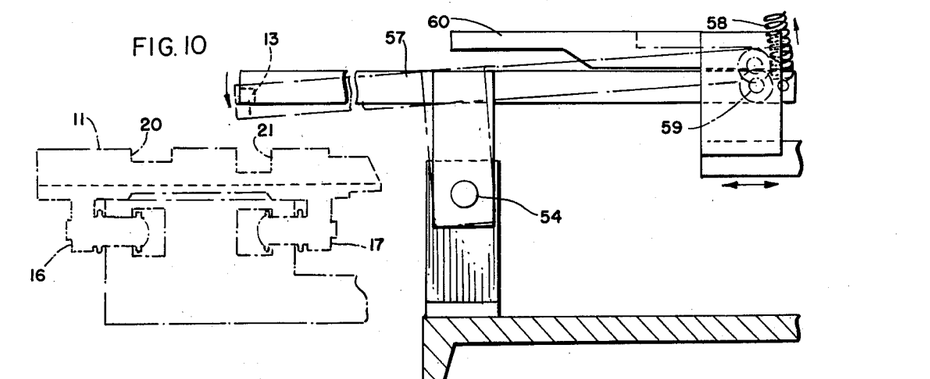
Fig. 10 is a vertical section along the line 10—10 of Fig. 5 and showing a cam operated depressor member for lowering the rearward ends of the bunched elongated articles into a conveyer bucket.
Figure 11:
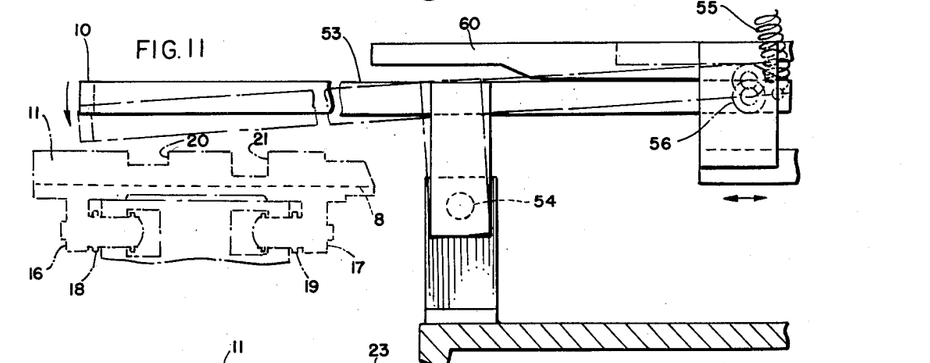
Fig. 11 is a vertical section along the line 11—11 of Fig. 5 and showing a similar cam operated depressor member for depressing the forward ends of the elongated articles.
Figure 12:
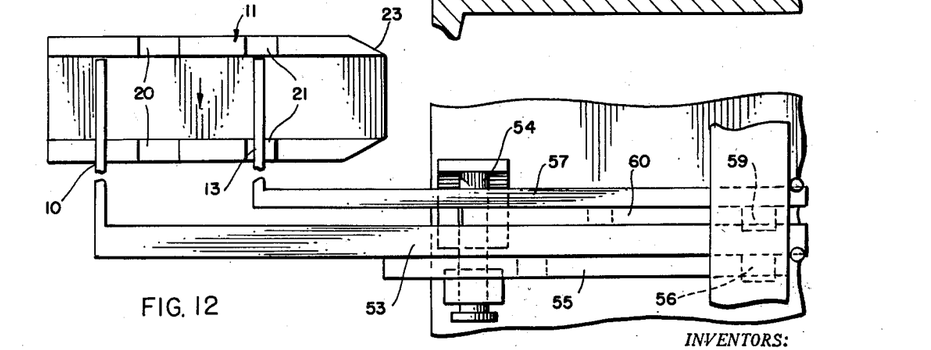
Fig. 12 is a horizontal section along the line 12—12 of Fig. 5 and showing the two cam operated depressor members.
Figure 13:
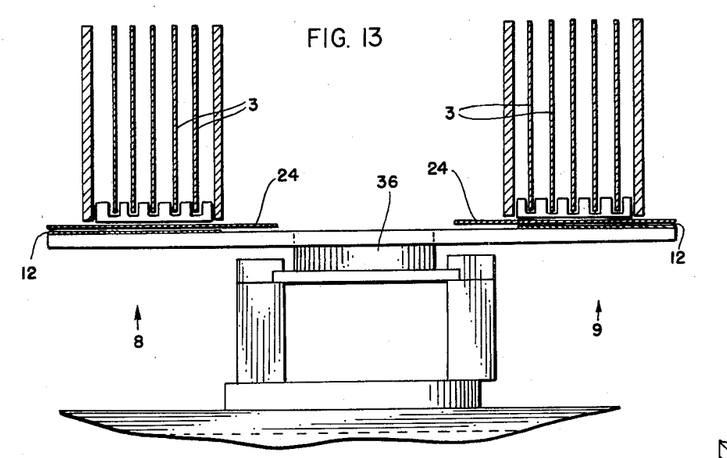
Fig. 13 is a vertical section along the line 13—13 of Fig. 4 and shows the chutes into which the elongated articles descend, the supporting members, and the pusher members which move the articles from the lower extremity of the chutes formed by the fixed dividing partitions.

The apparatus for depressing the bunched articles 1 into the bucket 11 comprises a pair of depressor bars 10 and 13, the detailed structure of which are shown in Figs. 10, 11, and 12. The depressor member 10 is the first in sequence to operate, and the mechanism for such operation includes a T-shaped lever 53 which rocks about a pivot point 54. A spring 55 urges the right end (in Fig.

11) of the lever upward and consequently the depressor bar 10, which is attached to the left end of the lever, is urged downward. The lever is operated by a slide cam 55 which moves across a cam roller 56 attached to the lever 53.

After the forward ends of the articles are depressed into the bucket 11 by the depressor member 10, the support plate 12 is withdrawn from under the rearward ends of the articles 1, and the second depressor bar 13 contacts the rearward ends of the articles and forces them downward into the bucket 11. The operating means for the depressor bar 13, as shown in Fig. 10, is similar to that of the depressor bar 10 illustrated in Fig. 11. A T-shaped lever 57 pivots about the same shaft 54 used by the T-shaped lever 53 (see Fig. 1). A spring 58 urges the right end of the T-shaped lever upward, and a cam roller 59 is operatively engaged against a slide cam 60.

Figure 14:
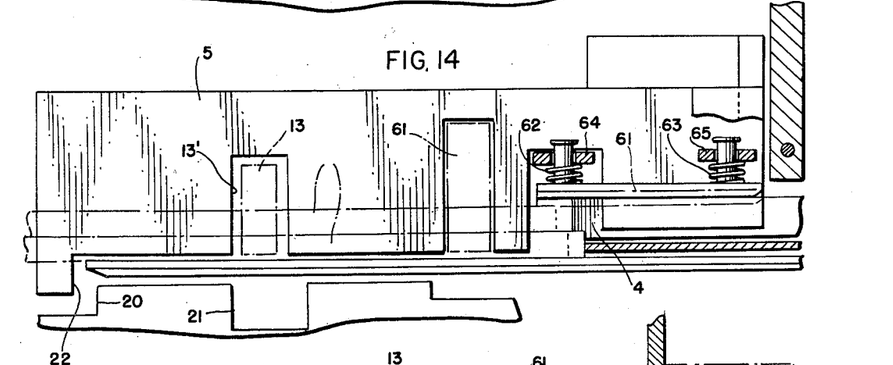
Fig. 14 is an enlarged detailed portion of Fig. 4 illustrating the cooperative relation between the movable dividing partitions, the depressor members, and the pusher members.

As may be schematically seen in Figs. 15 and 16, a third depressor member 61 presses against the articles as the pusher member 4 is withdrawn. This depressor 61 is urged downward by springs 62 and 63 which compress against a support member 64 and 65 (Fig. 14).

As is illustrated in Figs. 4 and 6, the movable partitions 5 are provided with downwardly extending parts 22 located at the extreme forward ends. The extensions 22 provide additional guiding as the partitions are lifted and the articles are bunched. Because of their location at the forward ends of the partitions 5, they will not interfere with the movable support plate 12.

It is desirable to provide a second downwardly extended part on the partitions 5 located at a more rearward location, but if such extension were integral with the partition 5, it would interfere with the support plate 12. Therefore, each partition 5 is provided with a slidable insert 66 (Figs. 6 and 7) which will retract when the partition is in a lowered position over the movable support plate 12, and will extend as the partition is lifted away from the support plate.

As shown in Fig. 7, the slide insert 66 is mounted to move within a slot 67 of the partition 5. A machine screw 68 is attached to the slide insert 66 and extends through a slotted hole 69 which limits the slidable movement of the insert 66. A spring 70 urges the insert 66 downwardly. A hooked part 71 integral with the slide insert 66 extends upward and is engageable with a member 72 which does not move vertically as the partition 5 is moved, and, therefore, functions to limit the downward movement of the insert 66. When the partition 5 is lowered over the support plate 12, the hooked part 71 engages the member 72 and the insert 66 is retracted into the slot 67. When the partition 5 is raised, the spring causes the insert 66 to remain at a fixed position above the support plate 12 until a partition 5 is raised the length of the slot 69; then the center divider engages the screw 68 and lifts the part 66 the thickness of two pencils so that the buncher can come in to gather pencils. The part 66 is only in the plates which are on each side of the central vertical divider plate 5.

As illustrated in Figs. 2 and 5, the bucket filling assemblies including chutes formed by the fixed dividing partitions 3, the movable partitions 5 and the bunchers 6 and 7, are duplicated and are positioned to permit two buckets to be filled simultaneously. This permits faster operation of the conveyer since each bucket loading station fills only alternate buckets and the buckets which the first station fails to fill will be filled by the second station.

Figure 20:
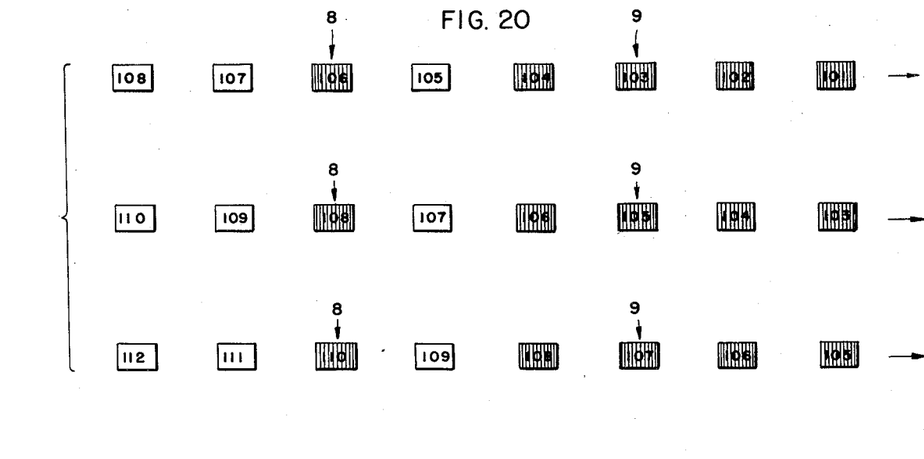
Fig. 20 is a schematic representation of the buckets of the conveyer illustrating in time sequence the manner in which a pair of bucket loading stations each load alternate buckets and together load all of the buckets of the conveyer.

Fig. 20 indicates schematically the method of filling the buckets. Each bucket is shown diagrammatically as a rectangle and is numbered 101 through 112 inclusive. The buckets are assumed to move past the loading stations 8 and 9 from left to right, and in the first line, buckets Nos. 103 and 106 are being filled while buckets Nos. 101, 102, and 104 have previously been filled. The second line shows the bucket positions at a subsequent time in which the buckets Nos. 105 and 108 are being filled, and the final line indicates the filling of buckets Nos. 107 and 110 at a subsequent time. It can be appreciated that the first bucket loading station 8 will load every even numbered bucket and that the second bucket loading station 9 will load every odd numbered bucket, and that the combined effect of both stations is to load each bucket of the conveyer without interference therebetween. In the packaging machine, as illustrated by the drawings, the two loading stations 8 and 9 are positioned with a spacing of three conveyer pitches, i. e., the linear distance between buckets. If it were inconvenient to place the loading stations 8 and 9 this close together, the same effect may be had if they were positioned five or seven conveyer pitches apart since in each case one loading station would load the odd numbered buckets and the second loading station would load the even numbered buckets.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A method for packaging elongated articles comprising assembling said articles in mutually parallel alignment, permitting said articles to descend in a predetermined number of chutes while maintaining the mutual parallel alignment, moving a predetermined number of articles from the lower extremities of the chutes into a plurality of spaces between parallel dividing partitions, and lifting said partitions from between the articles while bunching the articles into closer proximity with each other, the bunching of the articles being accomplished by members on opposite sides thereof, said members closing together to confine the articles within a reduced horizontal spacement.

2. A method for mechanically packaging elongated articles comprising assembling said articles in a hopper wherein said articles lie horizontally in mutually parallel alignment, permitting said articles to descend in a predetermined number of chutes from said hopper while maintaining the horizontal and mutually parallel alignment of the articles, moving the two bottom articles from each chute along their axes to positions between dividing partitions which separate articles moved from adjacent chutes, lifting said partitions from between the articles while bunching said articles causing closer spacement between articles previously separated by the partitions, and moving said bunched articles into a conveyer bucket, the bunching of the articles being accomplished by members on opposite sides thereof, said members closing together to confine the articles within a reduced horizontal spacement.

3. In a machine for placing a predetermined number of elongated articles in a package, apparatus for loading said articles into a conveyer bucket, said apparatus comprising a plurality of dividing partitions for holding the articles mutually parallel with each other, means for lifting the partitions, and a bunching means positioned on opposite sides of the partitions for bunching the articles into a compact group as the partitions are lifted, said bunching means comprising a pair of members and a drive means coupled to the members, each of said members being positioned adjacent to and on opposite sides of the plurality of partitions, the drive means being operable to close the members together and to reduce the spacing therebetween as the partitions are lifted.

4. In a machine for packaging elongated articles, apparatus for placing said articles into a conveyer bucket, said apparatus comprising a plurality of parallel movable dividing partitions for holding articles mutually parallel, bunching means including a bunching member positioned on each side of said plurality of partitions and disposed substantially parallel with the partitions, means cooperating with said plurality of partitions to position a predetermined number of said elongated articles between each adjacent pair of said plurality of partitions and between each bunching member and partition adjacent thereto, and means operatively associated with the bunching means for lifting the plurality of partitions from the articles positioned therebetween, said bunching means being operable to bunch the elongated articles into close spaced relation as the partitions are lifted.

5. In a machine for packaging elongated articles, apparatus for placing a predetermined number of said articles into a conveyor bucket in a predetermined number of layers, said apparatus comprising a plurality of parallel dividing partitions, bunching means including a bunching member positioned on each side of the dividing partitions, means for positioning the number of articles corresponding to the predetermined number of layers between each adjacent pair of dividing partitions and between each bunching member and the dividing partition adjacent to the bunching member, operating means associated with the dividing partitions and with the bunching means for simultaneously lifting the dividing partitions and for moving the bunching members together.

6. In a machine for packaging elongated articles, apparatus for placing a predetermined number of said articles into a conveyer bucket in a predetermined number of layers, said apparatus comprising a plurality of fixed dividing partitions forming a plurality of parallel chutes into which said articles descend, bunching means including a plurality of movable dividing partitions arranged mutually in parallel and a pair of flat bunching members arranged generally parallel to and on opposite sides of the plurality of movable partitions, means operatively associated with the bunching means to move said bunching means alternately into spaced relation with the fixed partitions and alternately into spaced relation with the moving conveyer bucket, means operatively associated with said fixed partitions for moving a predetermined number of articles from each chute between adjacent pairs of the fixed partitions to positions between adjacent pairs of the movable partitions and between the bunching members and the movable partitions adjacent to the bunching members, means for lifting the movable partitions and simultaneously closing the bunching members to bunch the articles into close proximity with each other, and means for lowering the bunched articles as a unit into the conveyor bucket.

7. In a machine for packaging elongated articles, apparatus for bunching a predetermined number of said articles in a predetermined number of layers, said apparatus comprising a plurality of partitions, movable supporting means from which said partitions extend downwardly, a pair of bunching members disposed substantially in parallel, said partitions being movably supported between the bunching members, means operatively associated with the movable supporting means and with the bunching members for lifting the partitions and simultaneously moving the bunching members into closer spacement with each other, said partitions extending downwardly in varying lengths from the supporting means whereby various partitions will be withdrawn from between adjacent articles sequentially as said bunching means closes upon the articles.

8. In a machine for packaging elongated articles, apparatus for bunching a predetermined number of said articles in a predetermined number of layers, said apparatus comprising a plurality of partitions, movable supporting means from which said partitions extend downwardly, a pair of bunching members disposed substantially in parallel, said partitions being movably supported between the bunching members, means operatively associated with the movable supporting means and with the bunching members for lifting the partitions and simultaneously moving the bunching members into closer spacement with each other, each of said partitions having a pair of downwardly extending extensions, the first of said extensions being integral with the partition and being positioned at the forward extremity of the partitions, said partition having a slot extending upwardly from the bottom of said partition in a position to the rearward of the first extension, the second of said extensions being slidably mounted to retract into the slot in said partition, said extensions of the various partitions extending downwardly in varying lengths whereby the various partitions including the extensions thereof will be withdrawn sequentially from between adjacent articles as said bunching means closes upon the articles.

9. The apparatus according to claim 8 wherein the second extension of the partitions is coupled with a spring for urging said extension downwardly and wherein said second extension includes a part engageable with means limiting the downward movement of the extension as the partition is moved downwardly.

10. In a machine for packaging elongated articles, apparatus for filling buckets of a movable conveyer with said articles, said apparatus comprising two bucket loading stations, each bucket loading station including a plurality of dividing partitions for holding the articles mutually parallel with each other, means for lifting the partitions, and means positioned on opposite sides of the partitions for bunching the articles into a compact group as the partitions are lifted, means for lowering the bunched articles into a conveyer bucket, and synchronizing means associated with the conveyer whereby each loading station operates to fill alternate buckets on the conveyer and whereby the two loading stations cooperate to fill all of the buckets along the movable conveyer.

11. In a machine having a movable conveyer with buckets for holding and carrying elongated articles, apparatus for loading said buckets with said articles, said apparatus comprising means for assembling said articles into a bunch having a predetermined number of layers, each layer having a predetermined number of articles in mutually parallel positions, said assembling means being positioned to hold the bunched articles in a cantilevered position over one of the buckets of the conveyer, means including a pair of depressor bars positioned to engage and depress the cantilevered articles into the bucket, the first of said depressor bars being operative to depress and tilt the forward ends of the articles into the forward end of the bucket, and the other depressor bar being operative to subsequently depress the rearward ends of the articles into the other end of the bucket.

12. In a machine having a movable conveyer with buckets for holding and carrying elongated articles, apparatus for loading said buckets with said articles, said apparatus comprising a support plate, means operatively associated with the support plate to impart a reciprocating motion thereto, means for assembling said articles into a bunch having a predetermined number of layers resting upon the support plate, each layer having a predetermined number of articles in mutually parallel positions, said assembling means being positioned to hold the bunched articles in a position cantilevered forward from the support plate, a first depressor bar positioned to descend across the forward ends of the cantilevered articles, said first depressor bar being operable to depress the forward ends of the bunched articles from the cantilevered position into the forward end of one of said conveyer buckets, a second depressor bar positioned to descend across the bunched articles at a position rearward of the first depressor bar, and a spring loaded member positioned across the rearward ends of the bunched articles for urging said articles downward, said spring loaded member and said second depressor bar being operable to depress the bunched articles from the assembling means as the support plate is withdrawn by the reciprocating means, said second depressor bar being further operable to depress the rearward ends of the articles into the conveyor bucket.

13. In a packaging machine having a plurality of vertical partitions for maintaining elongated articles mutually parallel to each other and having a depressor bar for moving the articles downwardly into a conveyer, a bucket for receiving and carrying a predetermined number of the elongated articles along the conveyer of the packaging machine, said bucket comprising a generally rectilinear bottom part, a pair of opposed spaced vertical walls perpendicular to and integral with the bottom part, and a pair of downwardly extending lugs integral with the bottom part and the vertical walls for attachment to the conveyer, said vertical walls and said bottom part defining a space of rectilinear cross section having dimensions suitable for containing the predetermined number of the articles in a bunch of predetermined configuration, the vertical walls having a first downwardly extending notch to permit the bucket to move on the conveyer without interference with downward extensions of the vertical partitions positioned in close spacement over the conveyer, said vertical walls having a second downwardly extending notch to permit the depressor bar to descend into close proximity with the bucket and to depress the elongated articles therein without interference with the bucket.

References Cited in the file of this patent

UNITED STATES PATENTS

| | | |
|---|---|---|
| 2,682,983 | Ashcroft | July 6, 1954 |
| 2,703,669 | Voegelin | Mar. 8, 1955 |